United States Patent Office 3,264,175
Patented August 2, 1966

3,264,175
PREPARATIONS FOR COMBATTING COTTON PESTS
Gerold Heim, Gelterkinden, Switzerland, assignor to Ciba Limited, Basel, Switzerland, a Swiss company
No Drawing. Filed Jan. 14, 1964, Ser. No. 337,529
Claims priority, application Switzerland, July 17, 1963, 8,920/63
2 Claims. (Cl. 167—22)

The present invention provides a preparation for combatting cotton pests, which comprises as active principle a mixture of (a) A compound of the general formula (1)
$$R_1-(O)_{m-1} \diagdown \quad H \quad Cl$$
$$P-O-C=C$$
$$R_2-(O)_{n-1} \diagup \|\quad \diagdown$$
$$O \qquad Cl$$

wherein $R_1$ and $R_2$ each represents a lower aliphatic radical or a phenyl radical, and $m$ and $n$ each represents 1 or 2, with (b) A compound of the general formula (2)
$$R'-O \diagdown \quad OH$$
$$P-C-CCl_3$$
$$R''-O \diagup \|\quad |$$
$$O \quad H$$

wherein R′ and R″ each represents a lower alkyl radical, preferably a methyl group, the ratio $a:b$ being within the range from 1:10 to 10:1, together with a suitable carrier material.

If desired, one or more of the following additives may be present in the preparations: a solid vehicle, a solvent, an antioxidant, a stabilizer, a dispersant, a wetting agent and/or an adhesive.

The preparations of the above composition, which contain as component (a) the compound of the formula (3)
$$CH_3O \diagdown \quad H \quad Cl$$
$$P-O-C=C$$
$$CH_3O \diagup \|\quad \diagdown$$
$$O \qquad Cl$$

and as component (b) the compound of the formula (4)
$$CH_3O \diagdown \quad OH$$
$$P-C-CCl_3$$
$$CH_3O \diagup \|\quad |$$
$$O \quad H$$

are distinguished by having a particularly good action against prodenia and heliothis.

As component (a) there may also be used: diethyl-dichloro-vinyl phosphate, di-n-propyl- and diisopropyl-dichlorovinyl phosphate, di-secondary butyl-dichlorovinyl phosphate, di-n-butyl-dichlorovinyl phosphate, di-amyl-dichlorovinyl phosphates, methylethyl-dichlorovinyl phosphate, diallyl-dichlorovinyl phosphate, di-methoxyethyl-dichlorovinyl phosphate, diethoxy - ethyl - dichlorovinyl phosphate and also the compound of the formula (5)
$$CH_3O \diagdown \quad O$$
$$\qquad\quad \|$$
$$\text{(phenyl)} \quad P-O-CH=CCl_2$$

The proportions of the components (a) and (b) present in the preparations of the invention may vary within the limits indicated above; proportions of $a:b$ that are within the range from 4:1 to 1:4, for example, have proved particularly advantageous. An especially preferred ratio of $a:b$ is 1:1.

An important advantage of the preparations of the invention is that they display a better, and especially a more prolonged, action, and a stronger ovicidal action than an equal amount of active principle consisting exclusively of the component (a). In comparison with an equal amount of active principle consisting exclusively of the component (b) the new preparations have the decisive advantage that their application to cotton plants does not damage the plants, and that they develop their action against the pest more rapidly.

Thus in comparison with the known individual components (a) and (b) by themselves, the new preparations possess unexpected and considerable advantages.

The new preparations are effective against the various stages of development of insects and acarides, for example their eggs, larvae, imagines, and they act as contact and stomach poisons.

As emulsifiers and dispersants, which may be present as further components in the new preparations, there may be used non-ionic substances, for example condensation products of ethylene oxide with aliphatic alcohols, amines or carboxylic acids having a long-chain hydrocarbon radical comprising about 10 to 30 carbon atoms, for example the condensation product of octadecyl alcohol with 25 to 30 mols of ethylene oxide, or of commercial oleyl-amine with 15 mols of ethylene oxide, or of dodecylmer-captan with 12 mols of ethylene oxide. As suitable anionic emulsifiers, there may be mentioned: the sodium salt of dodecyl alcohol-sulfuric acid ester, the sodium salt of dodecylbenzenesulfonic acid, the potassium or triethanolamine salt of oleic acid or of abietic acid or of mixtures of these two acids, or the sodium salt of a petroleum-sulfonic acid. As catinonic dispersants, there may be used quaternary ammonium compounds, for example cetyl pyridinium bromide, or dihydroxy-ethylbenzyl dodecyl ammonium bromide, or dihydroxyethylbenzyl dodecyl ammonium chloride.

The various forms of the new preparations used in general pest control may contain the usual additives that improve the dispersion, the adhesion or the penetration. As such substances there may be mentioned: fatty acids, resins, adhesives, casein or, for example, alginates.

The control of cotton pests may also be carried out by treating the cotton plants with the components (a) and (b) as defined in claims 1 and 2 separately, one after the other with only a short time between the two treatments, these two components being used within the range of ratios specified above.

The following examples illustrate the invention:

EXAMPLE 1

Aqueous spray broths A, B and C were prepared from the following spray concentrates:

(A) 50% of the compound of the formula $$CH_3O \diagdown \quad H \quad Cl$$
$$P-O-C=C$$
$$CH_3O \diagup \|\quad \diagdown$$
$$O \qquad Cl$$

40% of a mixture of aromatic hydrocarbons (boiling range 212° C. to 273° C.), marketed under the trade name Resex, and 10% of an emulsifier consisting of 7 parts of the calcium salt of monododecylbenzene-mono-sulfonic acid and 3 parts of a polyethyleneglycol ether of sorbitan-monolaurate;

(B) 50% of the compound of the formula $$CH_3O \diagdown \quad OH$$
$$P-C-CCl_3$$
$$CH_3O \diagup \|\quad |$$
$$O \quad H$$

12.5 of urea, and 37.5% of water;

(C) A mixture of equal parts of the spray concentrates (A) and (B) described above.

EXAMPLE 2

(a) A cotton field that was strongly infested by Prodenia and Heliothis was divided into three plots and sprayed, respectively, with the spray broths A, B and C according to Example 1, in an amount of 4 kg. of active principle per hectare. The effect (on the pests) is shown in the following table:

Table

| Spray broth | Effect of a short contract (1 day) | Prolonged effect and ovicidal effect | Damage to plants |
|---|---|---|---|
| A | Pests substantially destroyed | Insufficient (after 2 weeks reinfestation was found). | None. |
| B | Insufficient | Definitely positive | Extensive, more especially burning of leaves. |
| C | Pests destroyed substantially completely. | Pests and their eggs destroyed substantially completely; no reinfestation found a fortnight later. | None. |

Similar good results were obtained when the mixture (C) of Example 1 was replaced by a mixture that contained the components (a) and (b) in the ratio of 4:1, 2:1, 1:3 and 1:4, while being otherwise of identical composition.

(b) Very good control effects against the aforementioned pests were also obtained when, instead of with the mixture (C) of Example 1, a cotton field was treated as described above under (a) in immediate succession or with an interval of at most 1 day with 2 different spray broths of which each contained the components (A) and (B) separately. The amount of preparation applied, that is to say components (A) and (B) together, corresponded to 4 kg. of active principle per hectare, and the amounts in which the separate components (A) and (B) were used corresponded to the values shown above under (a).

What is claimed is:

1. The method for combatting cotton pests which comprises applying to the cotton plants whereon the said effect is desired as active principle a mixture of (a) the compound of the formula

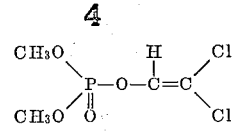

with (b) the compound of the formula

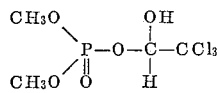

2. A method as claimed in claim 1, which comprises applying to the area whereon the said effect is desired the components (a) and (b) of the mixture defined in claim 1 separately and in such a manner that there is only an interval of at most one day between the two applications.

References Cited by the Examiner

UNITED STATES PATENTS 2,956,073  10/1960  Whetston _____ 167—30

FOREIGN PATENTS 884,168  12/1961  Great Britain.

JULIAN S. LEVITT, *Primary Examiner.*

JEROME D. GOLDBERG, *Assistant Examiner.*